US011346242B1

(12) United States Patent
Maxwell

(10) Patent No.: US 11,346,242 B1
(45) Date of Patent: May 31, 2022

(54) RETAINING EJECTED GAS TURBINE BLADES

(71) Applicant: William Maxwell, Decatur, GA (US)

(72) Inventor: William Maxwell, Decatur, GA (US)

( * ) Notice: Subject to any disclaimer, the term of this patent is extended or adjusted under 35 U.S.C. 154(b) by 0 days.

(21) Appl. No.: 17/344,560

(22) Filed: Jun. 10, 2021

(51) Int. Cl.
*F01D 21/04* (2006.01)
*F02K 3/06* (2006.01)

(52) U.S. Cl.
CPC .............. *F01D 21/045* (2013.01); *F02K 3/06* (2013.01); *F05D 2220/36* (2013.01); *F05D 2240/14* (2013.01)

(58) Field of Classification Search
CPC ........... F01D 21/045; F01D 25/24; F02K 3/06
See application file for complete search history.

(56) References Cited

U.S. PATENT DOCUMENTS

| | | | | |
|---|---|---|---|---|
| 4,012,549 A * | 3/1977 | Slysh | ........................ | B64C 1/08 428/116 |
| 6,575,694 B1 * | 6/2003 | Thompson | ............ | F01D 21/045 415/9 |
| 8,333,344 B2 * | 12/2012 | Vauchel | ................. | B64D 33/02 244/53 B |
| 8,517,309 B2 * | 8/2013 | Robinson | ................. | B64C 3/26 244/119 |
| 8,986,797 B2 * | 3/2015 | Xie | ......................... | B29C 70/32 428/34.1 |
| 2012/0224949 A1 * | 9/2012 | Harper | ...................... | F02K 3/06 415/9 |
| 2013/0266447 A1 * | 10/2013 | Evans | ...................... | F01D 5/30 416/191 |
| 2013/0336761 A1 * | 12/2013 | Evans | ................... | F01D 21/045 415/9 |
| 2014/0147270 A1 * | 5/2014 | Porte | ...................... | B64D 33/02 415/214.1 |
| 2014/0227076 A1 * | 8/2014 | Hoyland | ............... | F01D 21/045 415/9 |
| 2017/0226891 A1 * | 8/2017 | Twelves, Jr. | .......... | B32B 15/015 |
| 2019/0195085 A1 * | 6/2019 | Vinches | ................ | F01D 21/045 |
| 2020/0200038 A1 * | 6/2020 | Hall | ...................... | F01D 21/045 |

* cited by examiner

*Primary Examiner* — Craig Kim
(74) *Attorney, Agent, or Firm* — Fish & Richardson P.C.

(57) ABSTRACT

A first cylinder is configured to receive a gas turbine. A second cylinder surrounds an outer circumference of the first cylinder. Retainers extend from the second cylinder towards the first cylinder. Each of the retainers includes a central stalk that extends from the second cylinder towards the first cylinder and a branches extending radially from the central stalk.

21 Claims, 8 Drawing Sheets

RETAINING EJECTED GAS TURBINE BLADES

TECHNICAL FIELD

This disclosure relates to gas turbine nacelles for aircraft.

BACKGROUND

Gas turbine engines are often used in commercial aircraft as a source of propulsion. Gas turbine engines work by passing air through a compressor section, a combustor section, and a power section. The compressor pulls air into the engine and compresses the air into a small volume. In the combustor section, fuel is added to heat and rapidly expand the air. The power section includes one or more turbines that are driven by the rapidly expanding air. The one or more turbines drive the compressor and, in some instances, a turbofan located upstream of the compressor. A turbofan has a larger radius than the compressor inlet, allowing some of the air moved by the turbofan to bypass the compressor section, combustor section, and power section.

SUMMARY

This disclosure describes technologies relating to retaining ejected gas-turbine blades.

An example implementation of the subject matter described within this disclosure is a gas turbine engine nacelle with the following features. A first cylinder is configured to receive a gas turbine. A second cylinder surrounds an outer circumference of the first cylinder. Retainers extend from the second cylinder towards the first cylinder. Each of the retainers includes a central stalk that extends from the second cylinder towards the first cylinder and a branches extending radially from the central stalk. A stabilizing foam is within an annulus defined by the first cylinder and the second cylinder.

Aspects of the example gas turbine engine nacelle, which can be combined with the example gas turbine engine nacelle alone or in combination with other aspects, include the following. Each of the retainers includes one or more metal wires.

Aspects of the example gas turbine engine nacelle, which can be combined with the example gas turbine engine nacelle alone or in combination with other aspects, include the following. Each of the retainers is coated with an elastomer.

Aspects of the example gas turbine engine nacelle, which can be combined with the example gas turbine engine nacelle alone or in combination with other aspects, include the following. Each of the retainers comprises a material of sufficient strength and ductility to retain an expelled engine component at −45° F.

Aspects of the example gas turbine engine nacelle, which can be combined with the example gas turbine engine nacelle alone or in combination with other aspects, include the following. Each of the branches is biased away from the first cylinder.

Aspects of the example gas turbine engine nacelle, which can be combined with the example gas turbine engine nacelle alone or in combination with other aspects, include the following. The retainers are arranged in a square array.

Aspects of the example gas turbine engine nacelle, which can be combined with the example gas turbine engine nacelle alone or in combination with other aspects, include the following. Branches of a first retainer overlap with branches of a second retainer adjacent to the first retainer.

An example implementation of the subject matter described within this disclosure is a method with the following features. A first cylinder configured to surround a gas turbine engine is formed. A second cylinder surrounding the first cylinder is formed. Retainers extending from an interior surface of the second cylinder towards the first cylinder are attached to the interior surface of the second cylinder. Each of the retainers includes a central stalk that extends from the second cylinder towards the first cylinder and branches extending radially from the central stalk.

Aspects of the example method, which can be combined with the example method alone or in combination with other aspects, include the following. A gas turbine engine is received by the first cylinder.

Aspects of the example method, which can be combined with the example method alone or in combination with other aspects, include the following. An engine component is received by the retainers from a rotating gas turbine engine. The engine component is retained by the receivers.

Aspects of the example method, which can be combined with the example method alone or in combination with other aspects, include the following. A speed of the engine component is reduced by the retainers prior to being retained by the retainers.

An example implementation of the subject matter within this disclosure is a gas turbine engine nacelle with the following feature. A sleeve surrounding an outer circumference of a gas turbine engine. The sleeve includes a first cylinder surrounding an outer circumference of the gas turbine engine. A second cylinder surrounds an outer circumference of the first cylinder. Retainers extend between the first cylinder and the second cylinder. Each of the retainers include a central stalk that extends from the second cylinder towards the first cylinder, and branches extending radially from the central stalk.

Aspects of the example gas turbine engine nacelle, which can be combined with the example gas turbine engine nacelle alone or in combination with other aspects, include the following. The gas turbine engine is a turbofan engine.

Aspects of the example gas turbine engine nacelle, which can be combined with the example gas turbine engine nacelle alone or in combination with other aspects, include the following. A length of the sleeve surrounds an outer circumference of a fan of the turbofan.

Aspects of the example gas turbine engine nacelle, which can be combined with the example gas turbine engine nacelle alone or in combination with other aspects, include the following. A stabilizing foam is within an annulus defined by the first cylinder and the second cylinder.

Aspects of the example gas turbine engine nacelle, which can be combined with the example gas turbine engine nacelle alone or in combination with other aspects, include the following. The retainers are arranged in a hexagonal array.

Aspects of the example gas turbine engine nacelle, which can be combined with the example gas turbine engine nacelle alone or in combination with other aspects, include the following. The engine nacelle defines a channel directing heat into an annulus defined by the first cylinder and the second cylinder. The directed heat is configured to maintain a desired temperature of the retainers within the annulus.

Aspects of the example gas turbine engine nacelle, which can be combined with the example gas turbine engine nacelle alone or in combination with other aspects, include the following. Each of the branches is biased away from the first cylinder.

Aspects of the example gas turbine engine nacelle, which can be combined with the example gas turbine engine nacelle alone or in combination with other aspects, include the following. Branches of a first retainer overlap with branches of a second retainer adjacent to the first retainer.

Particular implementations of the subject matter described in this disclosure can be implemented so as to realize one or more of the following advantages. Expelled engine components are trapped and retained (e.g. captured) within the engine nacelle, significantly reducing the likelihood of further damage to the engine, parts of an engine nacelle or other portions of the aircraft. The retainers discussed herein can be installed during manufacturing of a new jet engine or added to existing jet engines, thereby enhancing jet engine safety without having to replace already deployed jet engines.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In situations when a low-powered gas turbine engine component, such as a blade from a fan or compressor section, is expelled from an engine, such a component is typically contained within a gas turbine nacelle such that the component does not penetrate an aircraft fuselage. However, such an expelled engine component is often pulled into the engine itself, causing catastrophic damage throughout the engine, for example, by removing additional blades or damaging a power turbine. In some situations, this can lead to even further damage to other portions of the aircraft, such as the fuselage.

This disclosure describes a sleeve for the use in a gas turbine nacelle in aircraft that surrounds a gas turbine engine, which is referred to as a "sleeve" for brevity. The sleeve includes an inner cylinder and an outer cylinder. Retainers extend from the outer cylinder towards the inner cylinder. The cylinders each include a stalk with branches radiating from the stalk and biased towards the outer cylinder. In operation, any expelled engine components will penetrate the inner sleeve, and be slowed-down and retained (or captured) by the retainers and outer sleeve, thereby preventing further damage to the engine or other portions of the aircraft. As such, the sleeve solution discussed herein solves the problem of how to prevent damage to an engine or aircraft fuselage when a component of an engine is expelled from the engine. While primarily described in terms of trapping and/or retaining low-powered engine components, such as parts of a turbo fan or compressor section of a gas turbine engine, aspects of this disclosure can similarly be used to trap and/or retain high-powered components, such as from the combustor or turbine section of the gas turbine engine. Such a sleeve and retainers can be sized for specific engines.

Figure 1:
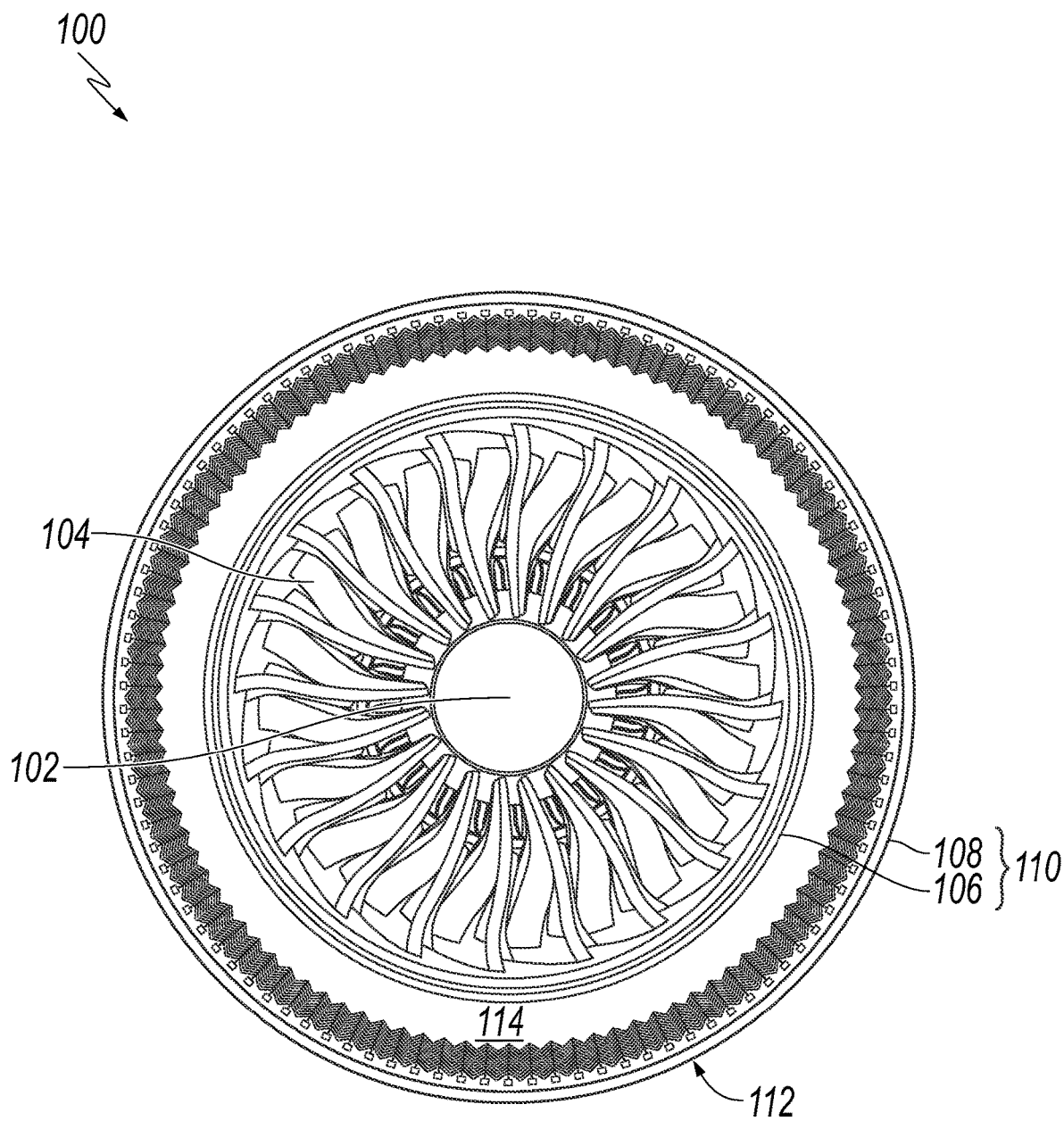
FIG. 1 is a front view of an example gas turbine nacelle.

FIG. 1 is a front view of an example gas turbine nacelle 100. The gas turbine nacelle 100 includes a gas turbine engine 102. In some implementations, the gas turbine engine 102 can include a turbofan 104. Surrounding the gas turbine engine 102 is an inner, first cylinder 106, configured to receive and/or retain the gas turbine engine 102. That is, the first cylinder is of a diameter, length, and includes and/or allows access to, mounting points for the gas turbine engine 102. The first cylinder 106 is made of a lightweight material that is configured to be penetrated if impacted directly by a high speed object, for example, a turbofan blade. In some implementations, the first cylinder 106 can be constructed of aluminum, carbon fiber, composite, or any other material of sufficient lightness and strength. In general, the first cylinder 106 should be configured to allow directly impacting objects to pass through, such as expelled engine components, and should deflect indirect impacts, such as dust or debris passing through the engine. For example, a threshold angle for an object to penetrate the first cylinder 106, instead of deflecting, can be substantially 10-15° from parallel to the first cylinder 106.

An outer, second cylinder 108 surrounds an outer circumference of the first cylinder 106. The first cylinder 106 and the second cylinder 108 make up a sleeve 110. The length of the sleeve 110 surrounds an outer circumference of a fan of the turbofan. That is, the sleeve 110 is arranged around the gas-turbine engine 102 such that the sleeve 110 will receive any expelled, low-energy engine components, such as turbofan or compressor blades. The second cylinder 108 is configured to retain any expelled engine components that penetrate the first cylinder 106. That is, the second cylinder 108 has sufficient strength (e.g., rigidity, ultimate strength) to prevent expelled components from radially leaving (e.g., penetrating or passing through) the sleeve 110. The second cylinder 108 can be constructed of aluminum, carbon fiber, composite, or any other material of sufficient lightness and strength to retain expelled engine components, while not adding more than a specified amount of excess weight to the plane. Strengthening structures, such as ribbing, can be included throughout the sleeve 110, for example, on either cylinder, without departing from this disclosure. Additional components can also be included within the gas turbine nacelle 100 without departing from this disclosure, for example, an aerodynamic shroud, hydraulic control systems, and electrical control systems.

Retainers 112 extend from an interior surface of the second cylinder 108 toward the first cylinder 106. Details on the retainers 112 are described throughout this disclosure. While primarily illustrated and described as having the retainers 112 arranged in such a fashion, other arrangements are possible without departing from this disclosure. For example, the retainers 112 can extend from an outer surface of the first cylinder 106 towards the inner surface of the second cylinder 108 without departing from this disclosure. Alternatively, the retainers 112 can extend between and connect to, both the first cylinder 106 and the second cylinder 108 without departing from this disclosure.

In some implementations, a stabilizing foam 114 can be included within an annulus defined by an outer surface of the first cylinder 106 and an inner surface of the second cylinder 108. In implementations where the retainers 112 are cantilevered, that is, connected to a single cylinder surface, the stabilizing foam 114 can act as a stabilizer to reduce the likelihood of fatigue cracking and/or resonant ringing of the retainers 112. In some implementations, the stabilizing foam 114 mitigates noise produced by the gas turbine engine. The foam 114 can include open cell foam, closed cell foam, or a combination. The foam 114 itself is low density in order to reduce overall weight and to allow expelled engine parts to enter the annulus at a variety of impact angles and velocities.

The retainers 112, first cylinder 106, second cylinder 108, and stabilizing foam 114 are configured to survive the extreme thermal cycles that are experienced by gas turbine nacelles 100 during operation. For example, each of the retainers 112 can be made of a material or combination of materials with a sufficient strength and ductility to retain an expelled engine component at substantially −45° F. (+ or −5%). In some implementations, each of the retainers 112 can be made of a material or combination of materials with a sufficient strength and ductility to retain an expelled engine component at substantially −75° F. (+ or −5%). In some implementations, each of the retainers 112 can be made of a material or combination of materials with a sufficient strength and ductility to retain an expelled engine component at substantially −100° F. (+ or −5%). Alternatively or in addition, in some implementations, the gas turbine nacelle 100 defines a channel 202 (see FIGS. 2A-2B) directing heat into the annulus to maintain a desired temperature of the retainers 112 within the annulus. That is, the gas turbine nacelle 100 can include an integral channel or a piece of tubing/piping acting a conduit to direct heated gas. Such a channel can direct a stream of gas from a compressor section of the gas turbine. Alternatively or in addition, heat media can be used to maintain a desired temperature of the retainers 112 within the annulus. For example, engine coolant can be routed adjacent to or with in the annulus.

Figure 2A:
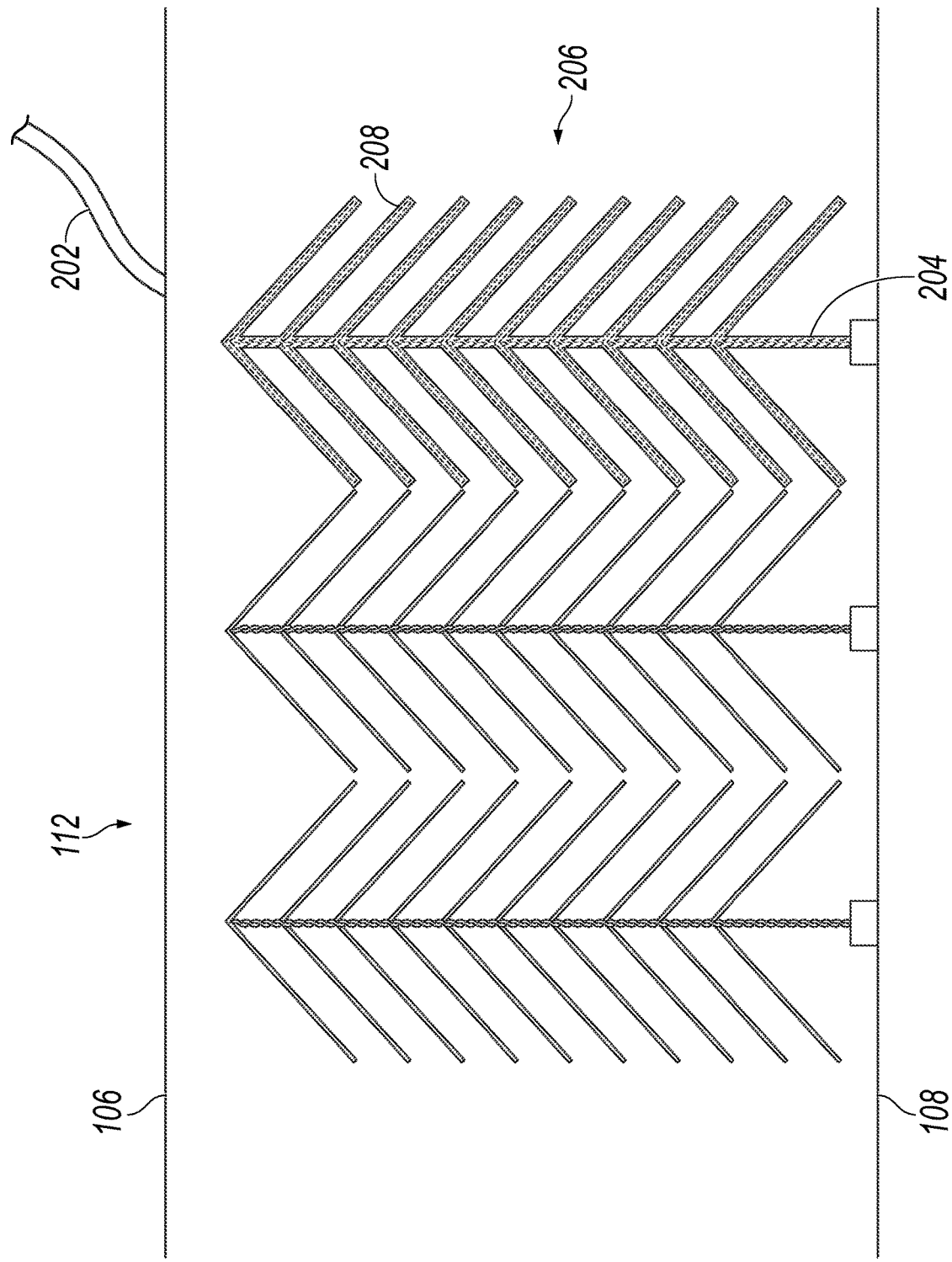
FIGS. 2A-2C are side views of example retainers that can be used with aspects of this disclosure.
Figure 2B:
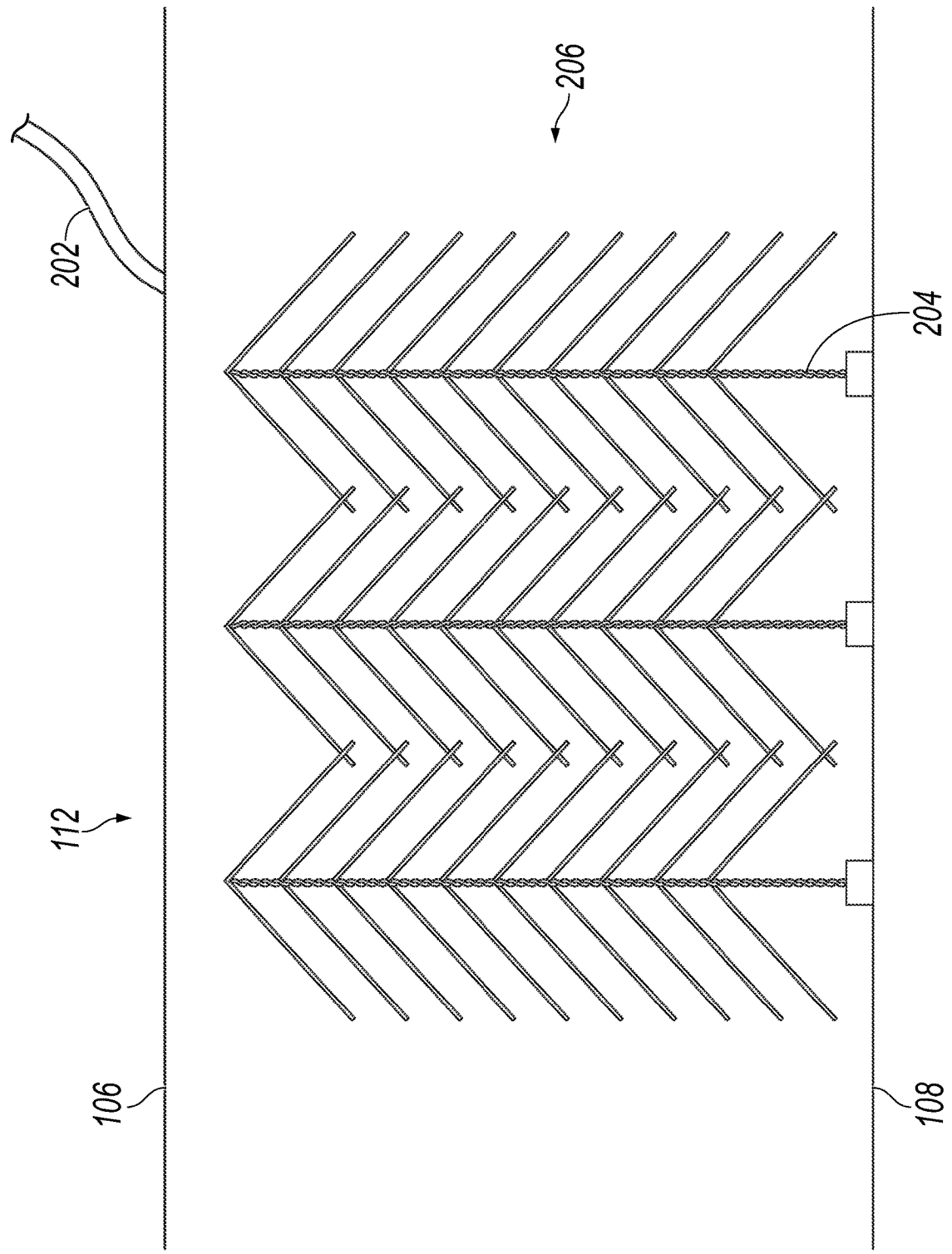
Figure 2C:
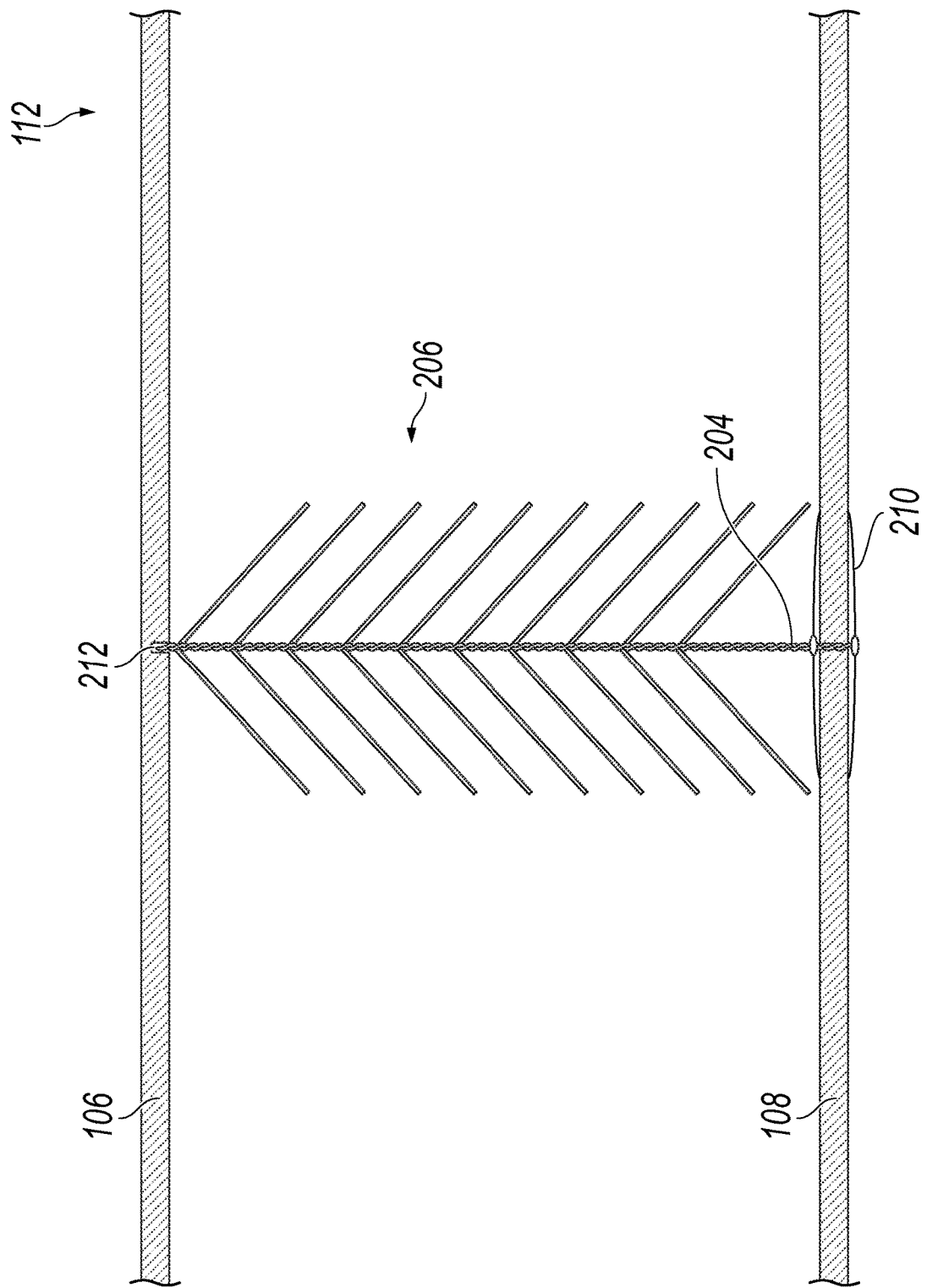

FIGS. 2A-2C are side views of example retainers 112 that can be used with aspects of this disclosure. The retainers 112 extend between the first cylinder 106 and the second cylinder 108. Each of the retainers 112 include a central stalk 204 that extends from the second cylinder 108 towards the first cylinder 106. Branches 206 extend radially from each central stalk 204. In general, each of the branches 206 is biased and/or directed away from the first cylinder 106. The bias allows expelled engine components to enter the retainers, and reduces the likelihood that such expelled engine components will leave the retainers 112 to re-enter the engine to cause damage to the gas turbine 102. The retainers 112 themselves can be made of one or more metal wires. For example, the central stalk 204 can be make of a twisted U-shaped wire while the branches can be retained by the twisted U-shaped wire. The branches can be made of wire made of the same material as the twisted U-shaped wire, but with a smaller diameter (higher gauge). The metal wires can be of a corrosion resistant alloy, such as stainless steel. Additionally or alternatively, as previously discussed, the metal wires can be made of a material that maintains sufficient strength and ductility throughout the operating temperature range of the gas turbine nacelle 100. In some implementations, the retainers 112 can be coated with an elastomeric coating 208. The elastomeric coating 208 can damp vibration as well as add an additional layer of corrosion protection. In some implementations, other coating can be used, for example, metallic, composite or other coatings can be used without departing from this disclosure.

While FIG. 2A illustrates retainers 112 adjacent (e.g., not overlapping) to one another, FIG. 2B illustrates retainers 112 with overlapping branches. That is, branches 206 of a first retainer 112 overlap with branches of a second retainer 112 adjacent to the first retainer 112. Such an overlap can improve the retention of expelled engine parts in comparison to the implementation shown in FIG. 2A; however, an increased number of retainers may be used in such a situation, increasing the total weight of the gas turbine nacelle 100. Therefore, the choice of using the retainers 112 in the configuration shown in FIG. 2A or the retainers 112 in the configuration shown in FIG. 2B can be made depending on the application and/or weight restrictions.

FIG. 2C illustrates a side view of a single retainer 112. In the illustrated implementation, the retainer 112 is attached to the second cylinder 108 by one or two biased washers 210 that are biased towards the second cylinder 108. The biased washers are connected to the central stalk 204 of the retainers by spot welding, brazing, sintering, epoxy, threaded fasteners, or any other suitable attachment with sufficient strength and fatigue resistance for the service. While illustrated as being curved, in some implementations once installed, the biased washers 210 are substantially flush and/or parallels with the second cylinder once installed. In some implementations, the inner cylinder 106 can define a recess 212 that receives a distal end of the retainer 112. Such implementations can reduce the ringing caused by a cantilevered structure, as well as reduce the likelihood of retainers flexing away from one another, thereby improving retention of any expelled engine component.

Figure 3A:
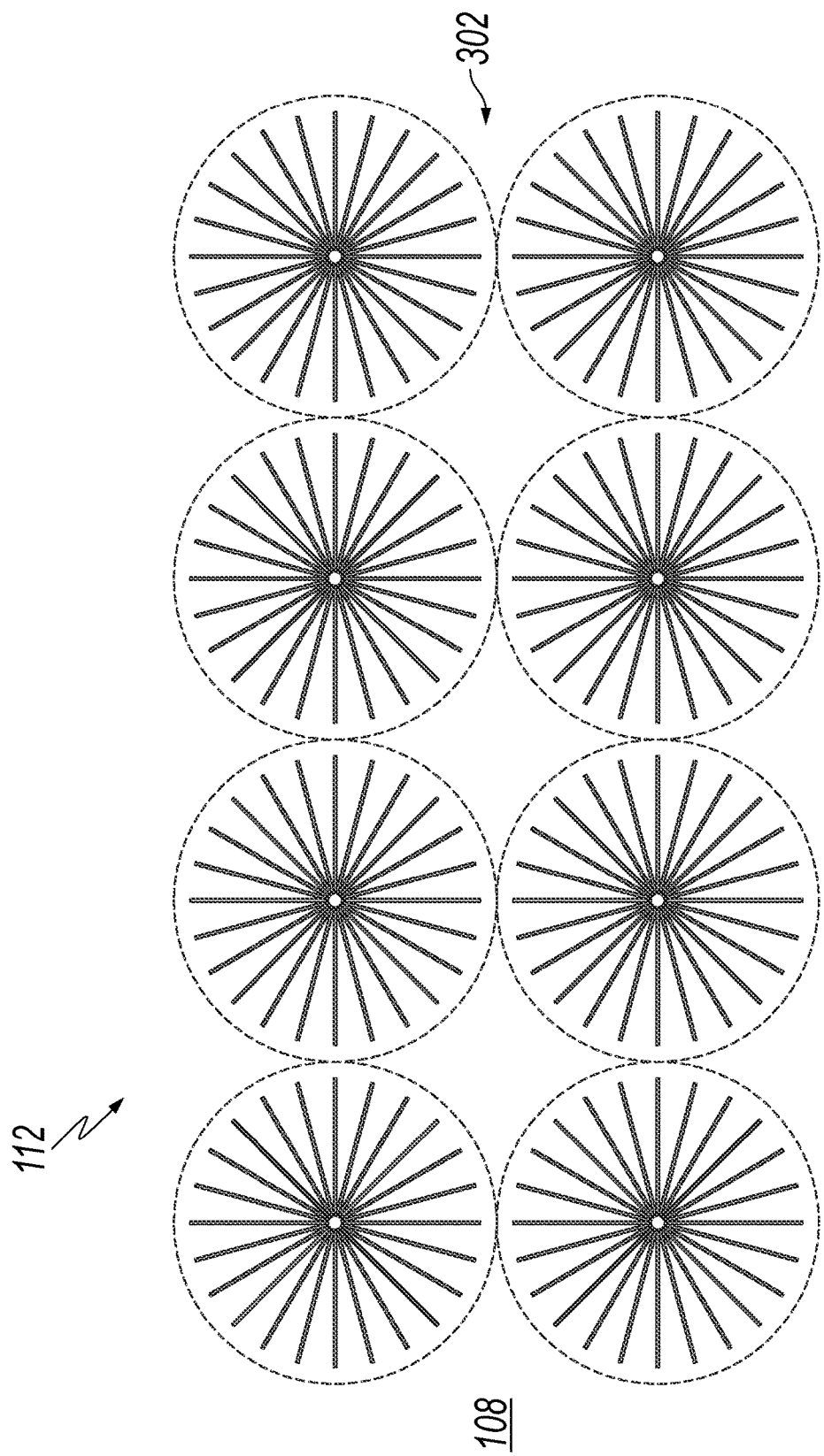
FIGS. 3A-3C are center-out views of example retainer arrangements that can be used with aspects of this disclosure.
Figure 3B:
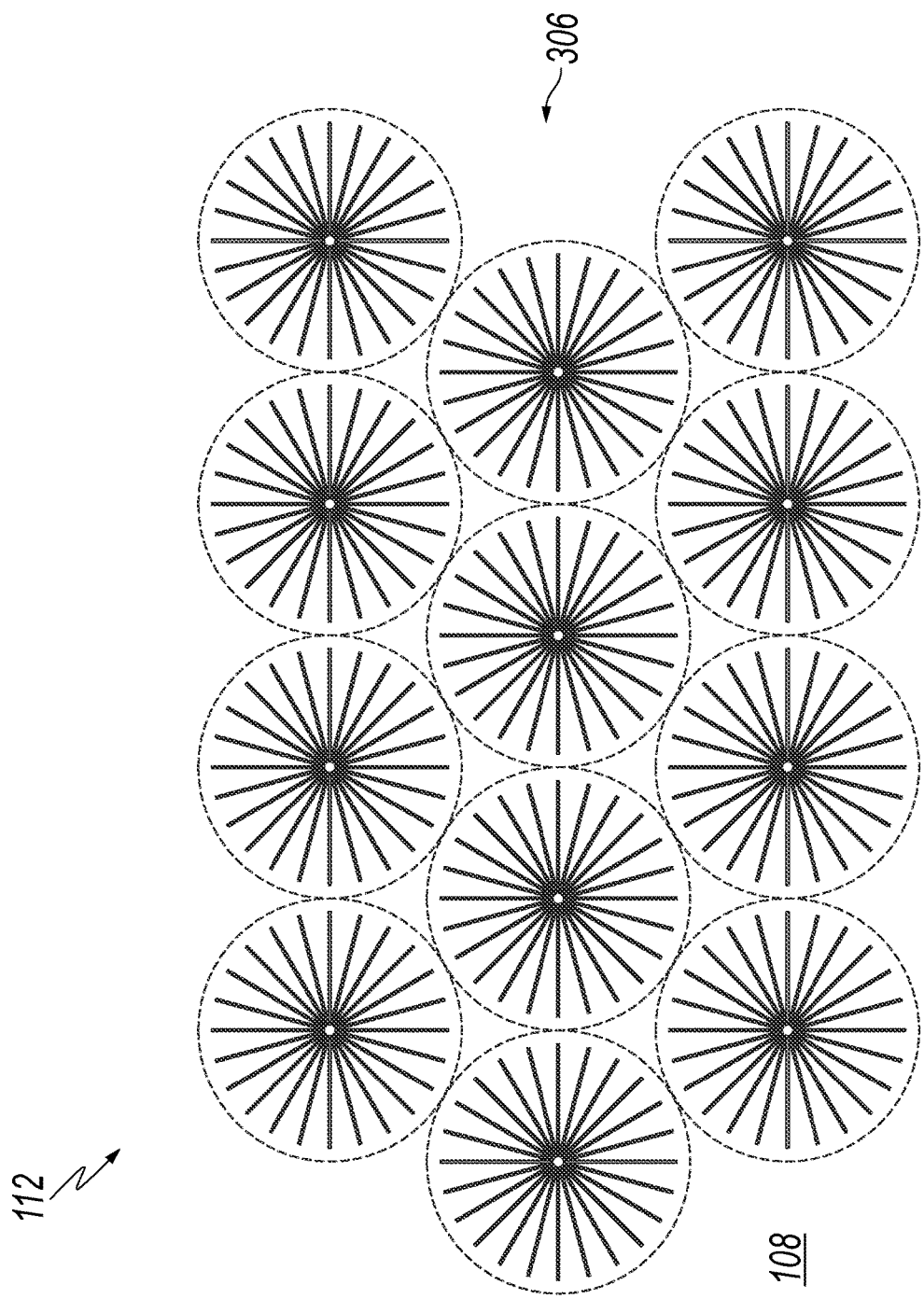
Figure 3C:
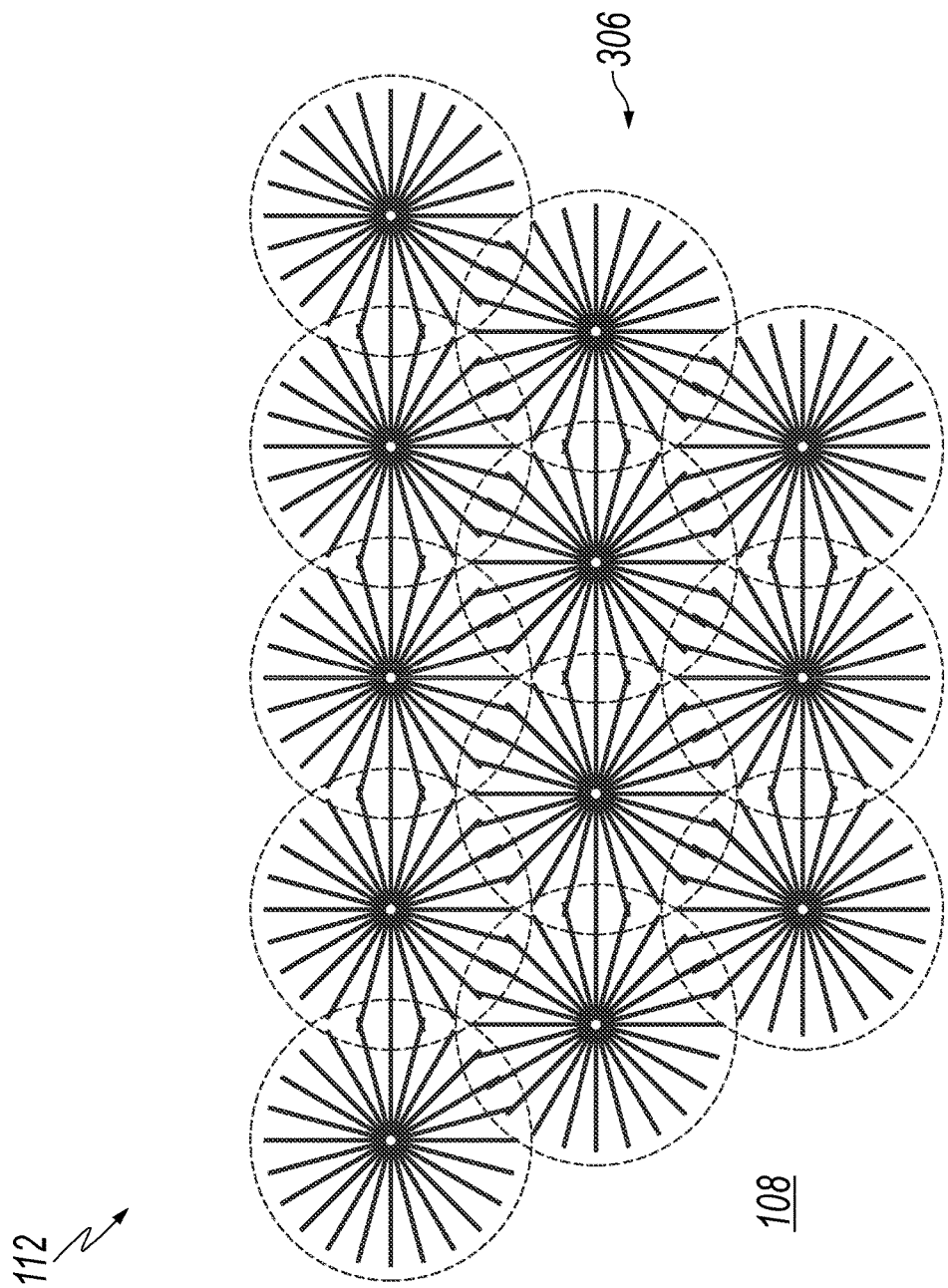

FIGS. 3A-3C are center-out views of example retainer arrangements that can be used with aspects of this disclosure. FIG. 3A illustrates retainers 112 arranged in a square array 302, or grid without branches 206 overlapping one another. FIG. 3B illustrates retainers 112 arranged in a hexagonal array 304. While the retainers 112 are primarily illustrated and described as having a roughly circular planar cross-section, other shapes can be used without departing from this disclosure. For example, hexagonal or square cross-sections can be used.

FIG. 3C illustrates retainers 112 arranged in a hexagonal array 306 with overlapping branches 206 between retainers. Such overlapping branches 206 can similarly be used in square array arrangements without departing from this disclosure.

Figure 4:
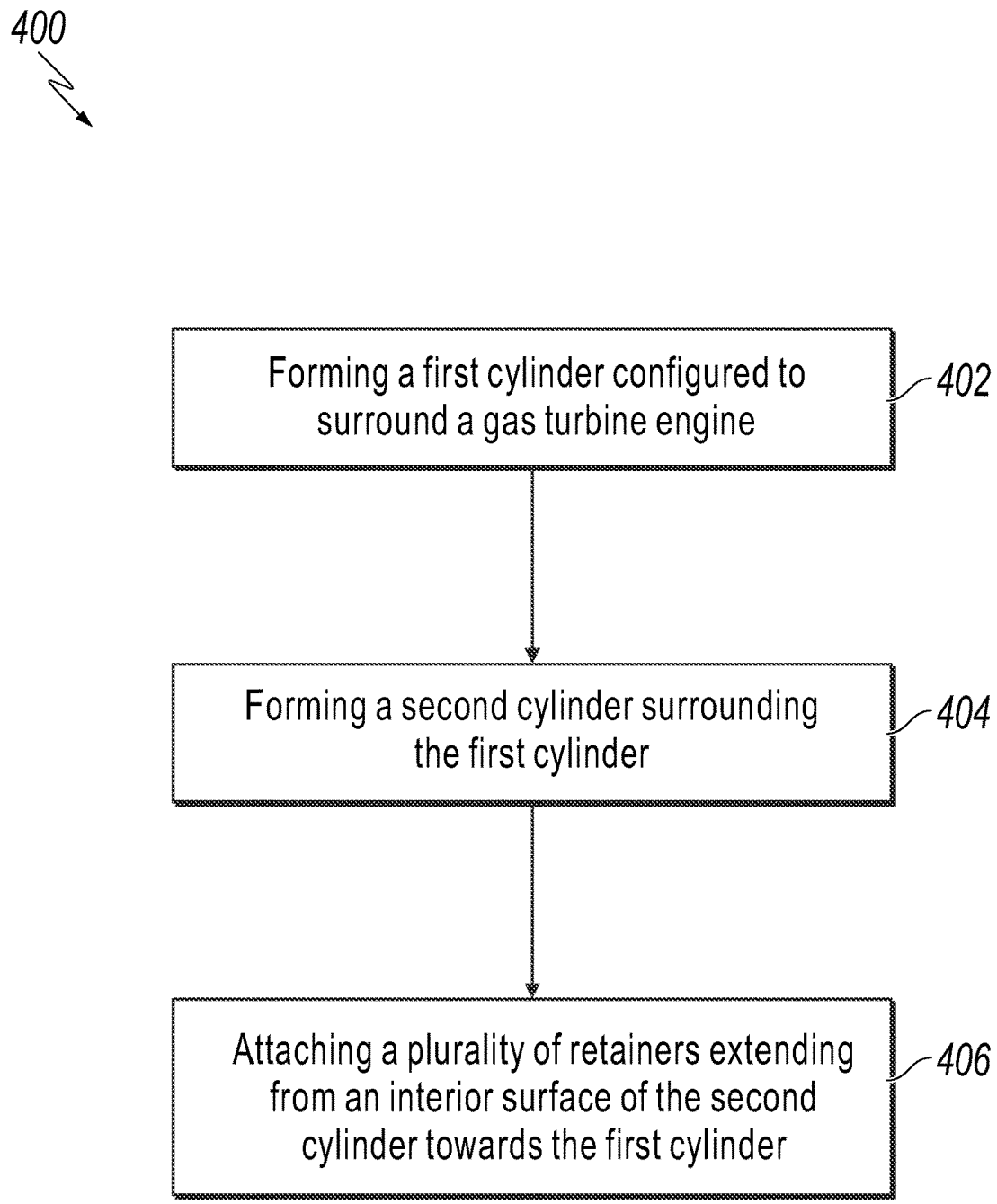
FIG. 4 is a flowchart of an example method of creating a sleeve for use in an aircraft nacelle that surrounds a gas turbine engine.

FIG. 4 is a flowchart of an example method 400 of creating a sleeve for use in an aircraft nacelle, such as gas turbine nacelle 100, which surrounds a gas turbine engine. At 402, a first cylinder 106, configured to surround a gas turbine engine, is formed. Such a cylinder can be formed in a variety of ways, for example, vacuum-forming and curing carbon fiber (or other composite), or rolling a sheet of aluminum and connecting overlapping ends. In some implementations, the first cylinder and/or the second cylinder can be made of segmented components, for example, segmented leaves and hinges can be used to allow for maintenance access. Such implementations can include latches and arrangements to maintain strength in operations. At 404, a second cylinder, configured to surround the first cylinder, is formed. The second cylinder 108 can be formed from a variety of materials, including those that have been listed for the first cylinder 106. The first cylinder 106 and the second cylinder 108 can be made of the same materials or different materials. "Surround", in the context of this disclosure, means encircling a perimeter, particularly surrounding the circumference of an object, such as the gas turbine 102 or the first cylinder 106.

Retainers are formed, for example, by twisting a U-shaped wire to form the central stalk 204. Branches 206, extending radially from each of the central stalks 204, can be formed retaining wire segments within the twisted U-shaped wire. The branches 206 can be made of wire made of the same material as the twisted U-shaped wire, but with a smaller diameter (higher gauge). In some implementations, the retainers can be dipped into or otherwise coated with an elastomer or other coating 208.

At 406, retainers 112, extending from an interior surface of the second cylinder 108 towards the first cylinder 106, are attached to the second cylinder 108. The retainers 112 can be connected to the second cylinder 108 by the base of the central stalk 204 in a variety of ways, for example, with epoxy, fasteners, compression fittings, or any other fastener with sufficient strength to maintain the connection during operation and flight, while having weight saving characteristics that prevent the total added weight of the retainer from exceeding a weight limit. ─┤ The retainers 112 can be arranged in a variety of ways, for example in a square or hexagonal grid with adjacent or overlapping branches 206.

Forming each of the retainers can include forming a central stalk. Once the retainers 112 are attached to the second cylinder 108, the first cylinder 106 is received by, or inserted into, the second cylinder 108. In some implementations, a foam is inserted (e.g., sprayed in, blown in, or otherwise inserted) into an annulus defined by the first cylinder 106 and the second cylinder 108. Once the first cylinder 106, the second cylinder 108, and the retainers are assembled, the sleeve is ready to accept a gas turbine engine, which can be received by the gas turbine nacelle 100.

In operation, in the event of an engine component being ejected radially from the rotating gas turbine engine, the ejected engine component is received by the sleeve. More specifically, the engine component penetrates the first cylinder. The second cylinder is of sufficient strength to retain the engine component within the second cylinder 108. As the engine component cannot leave the gas turbine nacelle 100, the speed of the engine component is reduced by the friction and interference caused by the retainers 112. The engine component is then retained (or captured) within the retainers 112. Such retention prevents the engine component from entering the rotating engine and causing further damage.

While this disclosure contains many specific implementation details, these should not be construed as limitations on the scope of any inventions or of what may be claimed, but rather as descriptions of features specific to particular implementations. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. In addition, the subject matter described herein can be applied within other fields without departing from this disclosure. For example, the subject matter described herein can be implemented with any gas turbine system, whether being used for power production or transport. Alternatively or in addition, the subject matter described throughout this disclosure can be applied to any rotating machinery that may expel components. Alternatively or in addition, the subject matter described throughout this disclosure can be applied to static equipment, or any other equipment that may expel components.

Similarly, while operations are depicted in the drawings in a particular order, this should not be understood as requiring that such operations be performed in the particular order shown or in sequential order, or that all illustrated operations be performed, to achieve desirable results. For example, the gas turbine engine 102 can be received by the first cylinder 106 prior to the first cylinder 106 being received by the second cylinder 108. Moreover, the separation of various system components in the implementations described above should not be understood as requiring such separation in all implementations, and it should be understood that the described components and systems can generally be integrated together in a single product or packaged into multiple products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A gas turbine engine nacelle comprising:
    a first cylinder configured to receive a gas turbine;
    a second cylinder surrounding an outer circumference of the first cylinder;
    a plurality of retainers extending from the second cylinder towards the first cylinder, each of the plurality of retainers comprising:
    a central stalk that extends from the second cylinder towards the first cylinder, the central stalk being separate from an adjacent central stalk of an adjacent one of the plurality of retainers, the central stalk being attached to only the second cylinder; and
    a plurality of branches extending radially from the central stalk.

2. The gas turbine engine nacelle of claim 1, further comprising a stabilizing foam within an annulus defined by the first cylinder and the second cylinder.

3. The gas turbine engine nacelle of claim 1, wherein each of the retainers comprises one or more metal wires.

4. The gas turbine engine nacelle of claim 1, wherein each of the retainers is coated with an elastomer.

5. The gas turbine engine nacelle of claim 1, wherein each of the retainers comprises a material of sufficient strength and ductility to retain an expelled engine component at $-45°$ F.

6. The gas turbine engine nacelle of claim 1, wherein each of the plurality of branches is biased away from the first cylinder.

7. The gas turbine engine nacelle of claim 1, wherein the retainers are arranged in a square array when viewed from the first cylinder.

8. The gas turbine engine nacelle of claim 1, wherein branches of a first retainer of the plurality of retainers overlap with branches of a second of the plurality of retainers adjacent to the first of the plurality of retainers.

9. The gas turbine engine nacelle of claim 1, wherein a distal end of the central stalk is received and retained by the first cylinder.

10. A method comprising:
    forming a first cylinder configured to surround a gas turbine engine;

forming a second cylinder surrounding the first cylinder;
attaching a plurality of retainers extending from an interior surface of the second cylinder towards the first cylinder, each of the plurality of retainers comprising:
a central stalk that extends from the second cylinder towards the first cylinder, the central stalk being separate from an adjacent central stalk of an adjacent one of the plurality of retainers, the central stalk being attached to only the second cylinder; and
a plurality of branches extending radially from the central stalk.

11. The method of claim 10, further comprising:
receiving a gas turbine engine by the first cylinder.

12. The method of claim 11, further comprising:
receiving an engine component, by the plurality of retainers, from a rotating gas turbine engine; and
retaining the engine component by the plurality of retainers.

13. The method of claim 12, further comprising reducing a speed of the engine component by the plurality of retainers prior to being retained by the plurality of retainers.

14. A gas turbine engine nacelle comprising:
a gas turbine engine;
a sleeve surrounding an outer circumference of the gas turbine engine, the sleeve comprising:
a first cylinder surrounding an outer circumference of the gas turbine engine;
a second cylinder surrounding an outer circumference of the first cylinder;
a plurality of retainers extending between the first cylinder and the second cylinder, each of the plurality of retainers comprising:
a central stalk that extends from the second cylinder towards the first cylinder, the central stalk being separate from an adjacent central stalk of an adjacent one of the plurality of retainers, the central stalk being attached to only the second cylinder; and
a plurality of branches extending radially from the central stalk.

15. The gas turbine engine nacelle of claim 14, wherein the gas turbine engine is a turbofan engine.

16. The gas turbine engine nacelle of claim 15, wherein a length of the sleeve surrounds an outer circumference of a fan of the turbofan.

17. The gas turbine engine nacelle of claim 14, further comprising a stabilizing foam within an annulus defined by the first cylinder and the second cylinder.

18. The gas turbine engine nacelle of claim 14, wherein the retainers are arranged in a hexagonal array.

19. The gas turbine engine nacelle of claim 14, wherein the engine nacelle defines a channel directing heat into an annulus defined by the first cylinder and the second cylinder, the directed heat configured to maintain a desired temperature of the retainers within the annulus.

20. The gas turbine engine nacelle of claim 14, wherein each of the plurality of branches is biased away from the first cylinder.

21. The gas turbine engine nacelle of claim 14, wherein branches of a first of the plurality of retainers overlap with branches of a second of the plurality of retainers adjacent to the first of the plurality of retainers.

* * * * *